(12) United States Patent
Takagawa et al.

(10) Patent No.: US 9,328,683 B2
(45) Date of Patent: May 3, 2016

(54) ELECTRONICALLY CONTROLLED DIESEL ENGINE

(75) Inventors: Isao Takagawa, Osaka (JP); Hitoshi Adachi, Osaka (JP); Go Asai, Osaka (JP); Kazuhiro Yamada, Osaka (JP); Tomohiro Fukuda, Osaka (JP); Takashi Miyamoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 1249 days.

(21) Appl. No.: 13/130,026

(22) PCT Filed: Sep. 16, 2009

(86) PCT No.: PCT/JP2009/066143
§ 371 (c)(1),
(2), (4) Date: Aug. 3, 2011

(87) PCT Pub. No.: WO2010/058650
PCT Pub. Date: May 27, 2010

(65) Prior Publication Data
US 2011/0320105 A1    Dec. 29, 2011

(30) Foreign Application Priority Data

Nov. 19, 2008    (JP) .................................. 2008-295944

(51) Int. Cl.
*B60T 7/12*    (2006.01)
*G05D 1/00*    (2006.01)
(Continued)

(52) U.S. Cl.
CPC .............. *F02D 41/10* (2013.01); *F02D 41/406* (2013.01); *F02D 2250/38* (2013.01); *Y02T 10/44* (2013.01)

(58) Field of Classification Search
CPC ..... F02D 2250/38; F02D 41/10; Y02T 10/44; Y02T 10/47
USPC ................. 123/456, 472, 478, 479, 480, 491; 701/101, 102, 103, 104, 110, 113
See application file for complete search history.

(56) References Cited

U.S. PATENT DOCUMENTS

| 6,571,774 B2 * | 6/2003 | Yomogida ............. F02D 41/062 123/456 |
| 2002/0020396 A1 * | 2/2002 | Sakamoto ............... F02D 41/10 123/492 |

(Continued)

FOREIGN PATENT DOCUMENTS

| JP | 63-143343 A | 6/1988 |
| JP | 06-185384 A | 7/1994 |

(Continued)

OTHER PUBLICATIONS

International Search Report for PCT/JP2009/066143, Japanese Patent Office, mailed Oct. 13, 2009, 2 pages.

*Primary Examiner* — Sizo Vilakazi
(74) *Attorney, Agent, or Firm* — Sterne, Kessler, Goldstein & Fox PLLC

(57) ABSTRACT

An object is to provide an electronically controlled diesel engine capable of inhibiting the drastic increase of the fuel injection quantity from the fuel injection quantity before acceleration without the measurement of the relation between the number of revolutions of an engine, boost pressure, and the upper smoke limit of the fuel injection quantity. An electronically controlled diesel engine includes an judge part of an acceleration (64) that judges whether a control of acceleration is finished or not based on a difference between a target number of revolutions of the engine (Nset) and an actual number of revolutions of the engine (Ne). The electronically controlled diesel engine includes that the calculate part of a third upper limit of a fuel injection quantity (73) that is included in the calculate part of the upper limit of the fuel injection quantity (65) that sets an initial upper limit of a fuel injection quantity (Q0) to a bigger injection quantity either of an injection quantity at the time of the judgment and a limit of a injection quantity based on the actual number of revolutions of the engine (Ne) at the time of the judgment when the judge part of an acceleration (64) determines that the condition of acceleration in the low speed area are satisfied and recover the limit value to the normal limit value until the judgment means of cancel of acceleration in the low speed area determines that the condition of cancel of acceleration in the low speed area are satisfied.

1 Claim, 4 Drawing Sheets

(51) Int. Cl.
  *G06F 7/00* (2006.01)
  *G06F 17/00* (2006.01)
  *F02D 41/10* (2006.01)
  *F02D 41/40* (2006.01)

(56) References Cited

U.S. PATENT DOCUMENTS

2005/0109028 A1* 5/2005 Shirakawa ............ F01N 3/0814
  60/602
2007/0012296 A1* 1/2007 Kakinuma ............ F02D 41/107
  123/492
2010/0076668 A1* 3/2010 Kogo .................. F02D 13/0249
  701/104

FOREIGN PATENT DOCUMENTS

| JP | 11-270360 A | 10/1999 |
| JP | 3060194 B2 | 7/2000 |
| JP | 3864671 B2 | 1/2007 |

* cited by examiner

Fig.4
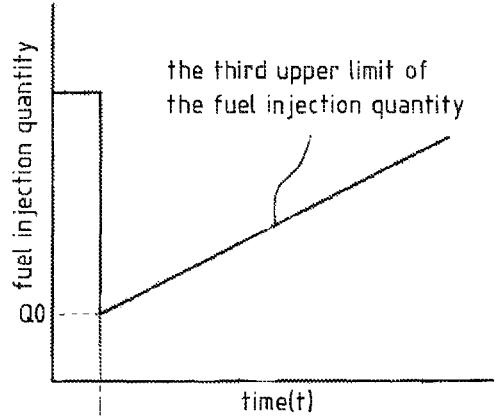
(a)
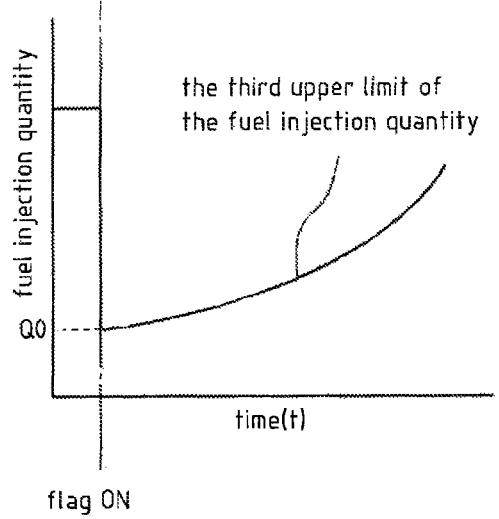
(b)
flag ON

ELECTRONICALLY CONTROLLED DIESEL ENGINE

TECHNICAL FIELD

The present invention relates to an electronically controlled diesel engine.

BACKGROUND ART

Conventionally, an engine, which is configured to limit a fuel injection quantity to an injection quantity corresponding to a boost pressure without a boost compensator when an engine with supercharger is accelerated drastically, is publicly known. More particularly, the engine is configured to memorize a relation between a number of revolutions of an engine, the boost pressure, and an upper smoke limit position of the control rack of the fuel injection pump before shipment and to inhibit a fuel injection quantity to less than the upper smoke limit position of a control rack of a fuel injection pump corresponding a detected number of revolutions of the engine. In other words, the engine is configured to set a limit of a fuel injection quantity to each the number of revolutions of the engine for acceleration before shipment by a controller.
[Patent Document 1] Japanese Patent No. 3060149.

DISCLOSURE OF THE INVENTION

Problems to be Solved by the Invention

However, in the prior art, it is necessary that the relation between the number of revolutions of an engine, the boost pressure, and the upper smoke limit position of the control rack of the fuel injection pump is measured before shipment and the number of the manufacturing process increases. If the fuel injection quantity is small, the fuel injection quantity drastically increases to the upper limit of the fuel injection quantity and becomes excessive for the intake gas quantity and the black smoke may be generated.

In view of the above-described problems, the present invention provides an electronically controlled diesel engine which inhibits the drastic increase of the fuel injection quantity from the fuel injection quantity before the engine is accelerated without measuring the relation between the number of revolutions of the engine, the boost pressure, and the upper smoke limit position of the control rack of the fuel injection pump before shipment.

Means of Solving the Problems

According to an embodiment 1, an electronically controlled diesel engine which decides fuel injection quantity by a controller includes a judgment means of acceleration in a low speed area, a judgment means of cancel of acceleration in the low speed area, and an inhibiting means of a limit of a fuel injection quantity that are connected to the controller. The electronically controlled diesel engine includes the judgment means of acceleration in the low speed area that judges whether predefined acceleration is done or not based on a difference between a target number of revolutions of the engine and an actual number of revolutions of the engine. The electronically controlled diesel engine includes the judgment means of cancel of acceleration in the low speed area that judges whether a control of acceleration is finished or not based on a difference between the target number of revolutions of the engine and the actual number of revolutions of the engine. The electronically controlled diesel engine includes that the inhibiting means of a limit of a fuel injection quantity that sets an initial limit value to a bigger injection quantity either of an injection quantity at the time of the judgment and a limit of a fuel injection quantity based on the actual number of revolutions of the engine at the time of the judgment when the judgment means of acceleration in the low speed area determines that the conditions of acceleration in the low speed area are satisfied and recover the limit value to the normal limit value until the judgment means of cancel of acceleration in the low speed area determines that the conditions of cancel of acceleration in the low speed area are satisfied.

According to another embodiment, the electronically controlled diesel engine may include that the recover characteristics of fuel injection quantity with a passing time of the inhibiting means of limit of a fuel injection quantity is selectable either of a characteristics of direct function or a characteristics that the recover rate during early phase of recovery is small and the recover rate during later phase of recovery is big.

Effects of the Invention

According to an embodiment, because the limit of the fuel injection quantity when the acceleration begins is set the fuel injection quantity at the time, drastic increase of the fuel injection quantity can be inhibited and the generation of black smoke can be prevented.

According to an embodiment, it is possible to choose the responsibility of the control of the accelerator as the operator likes.

BRIEF DESCRIPTION OF THE DRAWINGS

FIG. 4 (a) is a chart showing an alteration of the third upper limit of the fuel injection quantity during acceleration from moment to moment, FIG. 4 (b) is a chart showing an alteration of the third upper limit of the fuel injection quantity during acceleration from moment to moment.

Figure 1:
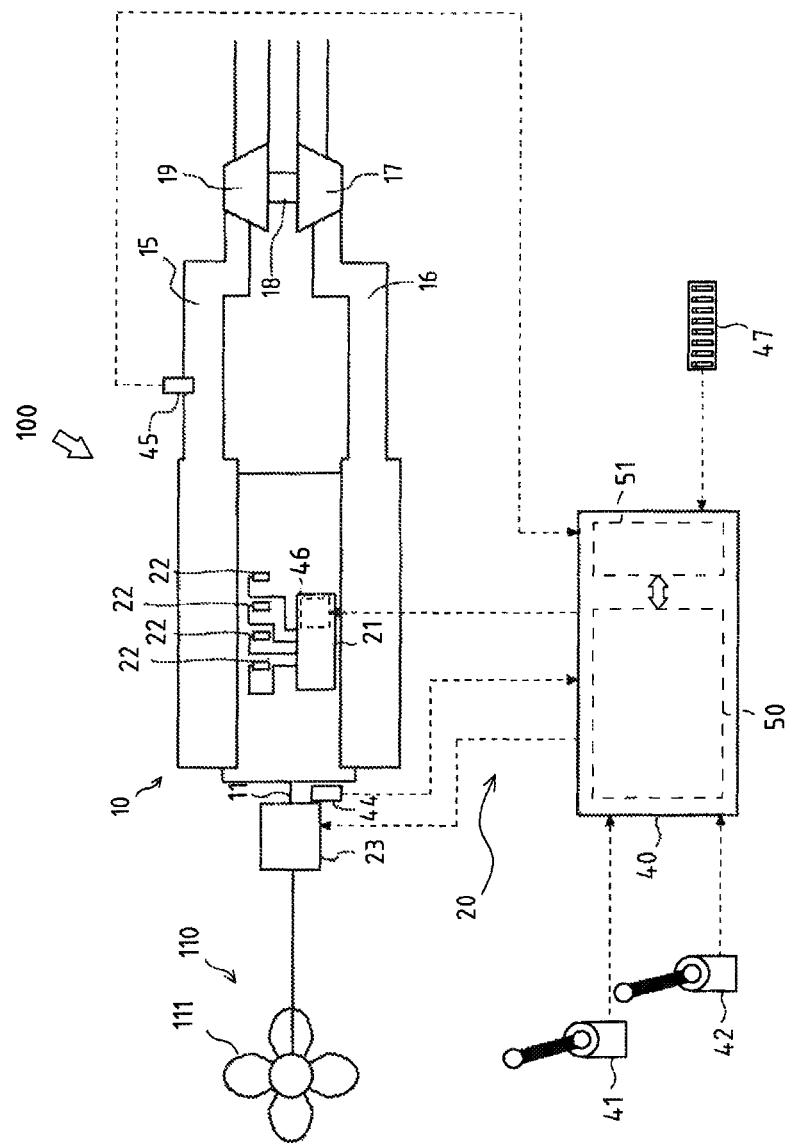
FIG. 1 is a schematic view showing a engine according, to the present invention.

EXPLANATION OF LETTERS OR NUMERALS 10 an engine body
20 a controller of fuel injection quantity
40 an ECU
41 an accelerator
42 a clutch
44 a sensor of a number of revolutions of the engine
45 a sensor of the intake gas quantity
47 a dip switch
50 a calculator
51 a memory
61 a calculate part of the target number of revolutions of the engine
62 a calculate part of an actual number of revolutions of the engine
63 a calculate part of the fuel injection quantity 64 a judge part of an acceleration
65 a calculate part of an upper limit of the fuel injection quantity
66 a select part of the minimum number
67 a process part of the upper limit of the fuel injection quantity
71 a calculate part of a first upper limit of a fuel injection quantity
72 a calculate part of a second upper limit of a fuel injection quantity
73 a calculate part of a third upper limit of a fuel injection quantity
100 an engine
Nset a target number of revolutions of the engine
Ne an actual number of revolutions of the engine
Q0 an initial upper limit of a fuel injection quantity
Qset a target fuel injection quantity
Qmax1 a first upper limit of the fuel injection quantity
Qmax2 a second upper limit of the fuel injection quantity
Qmax3 a third upper limit of the fuel injection quantity
Qfinal a final target fuel injection quantity

BEST MODE FOR CARRYING OUT THE INVENTION

Next, embodiments of the present invention will be described.

Figure 2:
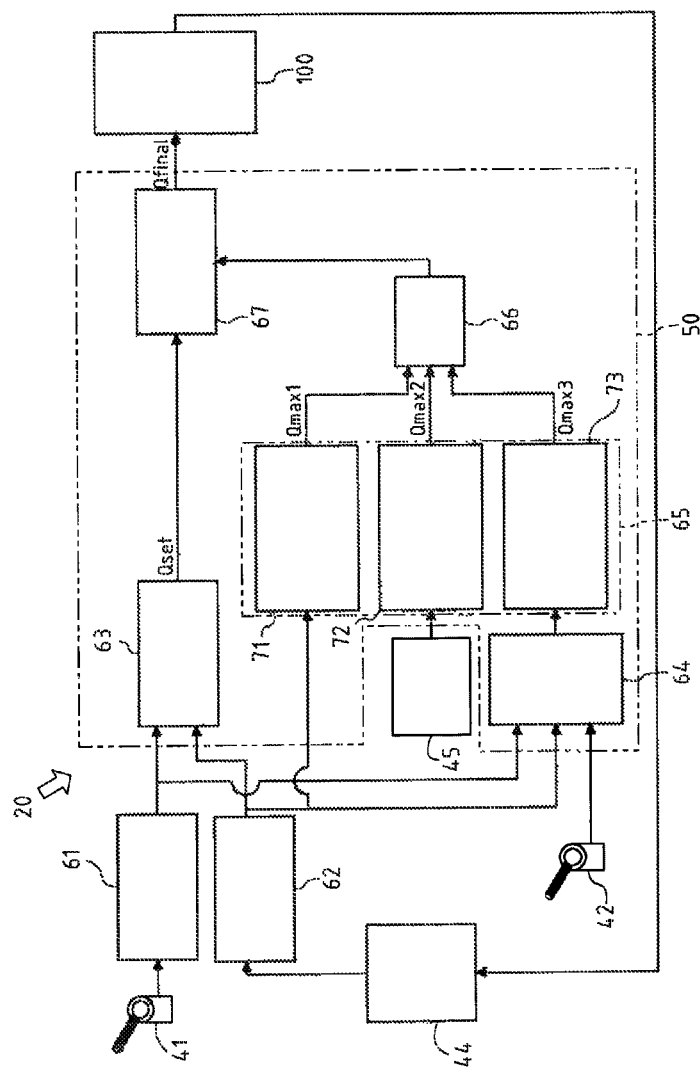
FIG. 2 is a schematic block view showing transmitting information of control of the limit of the injection quantity.
Figure 3:
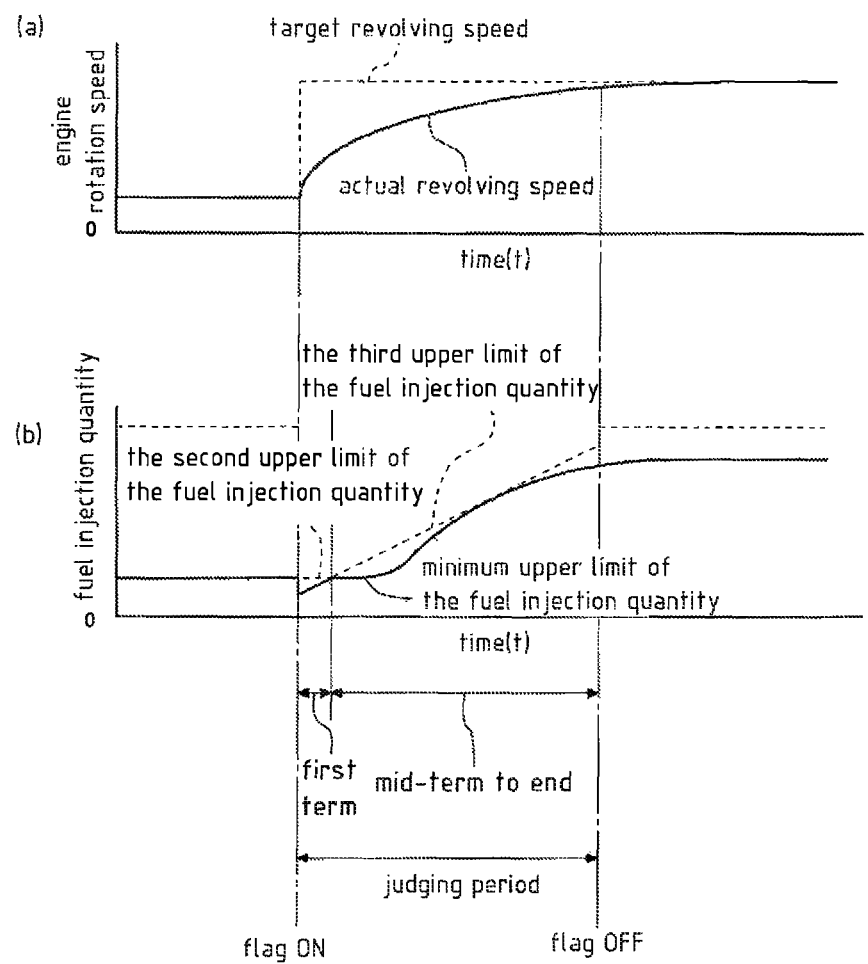
FIG. 3 (a) is a chart showing an alteration of the target number of revolutions of an engine and the actual number of revolutions of an engine from moment to moment, FIG. 3 (b) is a chart showing an alteration of the second limit of the injection quantity during acceleration from moment to moment.

FIG. 1 is a schematic view showing an engine according to the present invention. FIG. 2 is a schematic block view showing transmitting information of control of the limit of the injection quantity. FIG. 3 (a) is a chart showing an alteration of the target number of revolutions of an engine and the actual number of revolutions of an engine from moment to moment, (b) is a chart showing an alteration of the second limit of the injection quantity during acceleration from moment to moment. FIG. 4 (a) is a chart showing an alteration of the third upper limit of the fuel injection quantity during acceleration from moment to moment, FIG. 4 (b) is a chart showing an alteration of the third upper limit of the fuel injection quantity during acceleration from moment to moment.

An engine 100 that is the embodiment of the present invention is explained with FIG. 1. The engine 100 is mounted on a ship. The engine 100 is an in-line four cylinder engine which powers a driving unit 110 as an engine for a ship. The engine 100 includes an engine body 10, a controller of fuel injection quantity 20 as controller that control fuel injection quantity.

An output shaft 11 of the engine body 10 is connected to the driving unit 110. The output shaft 11 of the engine body 10 has a flywheel that is not shown in the figure. The driving unit 110 is a unit that powers a screw 111 by the movement of the output shaft 11 through a transmitter that is not shown in the figure. A clutch mechanism 23 for switching between connect and unconnect between the output shaft 11 and the driving unit 110 and between normal rotation and reverse rotation is provided.

The engine body 10 includes an intake gas passage 15 to intake air which is necessary for burning fuel and an exhaust gas passage 16 to exhaust gas after burning the fuel. A turbine part 17 is provided in the exhaust gas passage 16 and driven by the supply of the exhaust gas to the turbine part 17. The turbine part 17 is connected to a compressor part 19 for the intake air compression via a turbine shaft 18. The engine body 10 provides a supercharger.

The engine body 10 includes a fuel injection pump 21 and injectors 22,22,22,22. The fuel is pumped by the fuel injection pump 21 and sprayed into each of cylinders by the injectors 22,22,22,22. The fuel injection pump 21 is configured by an electric governor mechanism and includes a rack actuator 46. The engine 100 is not limited an engine with an electric governor and the engine 100 may be an engine with common-rail mechanism with which fuel injection is controlled.

The controller of fuel injection quantity 20 is an apparatus which decide an upper limit of the fuel injection quantity in the case of acceleration with low rotation area of the engine and a control fuel injection quantity. The controller of fuel injection quantity 20 is connected with an engine control unit (hereinafter called ECU) 40, an accelerator 41, a clutch 42, a sensor of a number of revolutions of the engine 44, a sensor of the intake gas quantity 45, the rack actuator 46, and a dip switch 47 as means for selecting. The ECU 40 includes a calculator 50 and memory 51. The accelerator 41 and the clutch 42 are provided in a helm position. The accelerator 41, as means for ordering the number of revolutions of the engine, has function to order the target number of revolutions of the engine to the ECU 40. The clutch 42, as means for switching between connect and unconnect and between normal rotation and reverse rotation of the clutch mechanism 23, has function to order the switch of the clutch mechanism 23 to ECU 40.

The sensor of the number of revolutions of an engine 44 is provided near the output shaft 11 of the engine 100. The sensor of the number of revolutions of the engine 44, as means for sensing the number of revolutions of the engine, has function to detect the number of revolutions of the engine Ne and to send to ECU 40. The sensor of the intake gas quantity 45 is provided nearer the engine body 10 than the compressor part 19 of the intake gas passage 15. The sensor of intake gas quantity 45 has function to detect an intake gas pressure as a significant signal for an intake gas quantity and to send to ECU 40. The rack actuator 46 controls the fuel injection quantity based on a final target fuel injection quantity Qfinal which is calculated by a processor of the upper limit of the fuel injection quantity 67 described below. The dip switch 47 as means for selecting has function to do selection and setting about various functions of the engine 100.

As shown in FIG. 2, a signal transduction of a control of the fuel injection quantity is illustrated. A calculator 50 has function of a calculate part of the target number of revolutions of the engine 61, a calculate part of an actual number of revolutions of the engine 62, a calculate part of the fuel injection quantity 63, a judge part of an acceleration 64, a calculate part of an upper limit of the fuel injection quantity 65, a select part of the minimum number 66, and a process part of the upper limit of the fuel injection quantity 67.

The calculate part of the target number of revolutions of the engine 61 has function to calculate the target number of revolutions of the engine Nset which is indicated by the accelerator 41. The calculate part of the actual number of revolutions of the engine 62 has function to calculate the actual number of revolutions of the engine Ne which is detected by the sensor of the number of revolutions of an engine 44.

The calculate part of the fuel injection quantity 63 has function as the means for calculating the fuel injection quantity based on a difference between the target number of revolutions of the engine Nset and the actual number of revolutions of the engine Ne. More particularly, the calculate part of the fuel injection quantity 63 has function to calculate the target fuel injection quantity Qset so that the difference between the target number of revolutions of the engine Nset calculated by the calculate part of the target number of revolutions of the engine 61 and the actual number of revolutions of the engine Ne calculated by the calculate part of the actual number of revolutions of the engine 62 is zero.

The judge part of the acceleration 64 has function of the judgment means of acceleration in a low speed area and the judgment means of cancel of acceleration in the low speed area. More particularly, the judge part of the acceleration 64, as the judgment means of acceleration in the low speed area, has function to judge drastic acceleration is done or not based on the difference between the target number of revolutions of the engine Nset calculated by the calculate part of the target number of revolutions of the engine 61 and the actual number of revolutions of an engine Ne calculated by the calculate part of the actual number of revolutions of the engine 62. Only if all the conditions that the difference between the target number of revolutions of the engine Nset and the actual number of revolutions of the engine Ne is bigger than the threshold value K1 at which the acceleration is determined, that the clutch is engaged, that the actual number of revolutions of the engine Ne is equal to or smaller than the upper limit number of revolution K2 at which the acceleration is allowed, that it isn't the moment when the engine starts or stops, and that the actual number of revolutions of an engine Ne is equal to or bigger than a minimum number of revolutions of an engine Nmin on the acceleration position are satisfied, the flag of determination of acceleration is set "ON".

That the difference between the target number of revolutions of the engine Nset and the actual number of revolutions of the engine Ne is bigger than the threshold value K1 at which the acceleration is determined is included in the conditions so as to judge whether acceleration is done actually or not. That the clutch is engaged is included in the conditions because engine load is heavy compared to the condition that the clutch is thrown out and the fuel injection quantity at the moment of the acceleration is big when the clutch is engaged and it is highly possible that black smoke is generated. Particularly, whether the clutch is engaged or not is judged by judging whether the clutch neutral signal is sent or not based on the information of switch of the clutch 42.

That the actual number of revolutions of the engine Ne is equal to or smaller than the upper limit number of revolution K2 at which the acceleration is allowed is included in the conditions because the turbo charger is not effective sufficiently in the condition that the actual number of revolutions of the engine Ne is equal to or smaller than the upper limit number of revolution K2 and it is highly possible that black smoke is generated. That it isn't the moment when the engine starts or stops is included in the conditions so as to prevent the judge part of the acceleration 64 from missing the judgment.

That the actual number of revolutions of the engine Ne is equal to or bigger than minimum number of revolutions of the engine Nmin on the acceleration position is included the conditions so as to prevent the engine stall because of the inhibition of the upper limit of the fuel injection quantity. For example, when the ship is stopped on the idle revolution, when the actual number of revolutions of the engine Ne reduces more than the revolution change quantity dN from the minimum number of revolutions of the engine Nmin, the upper limit of the fuel injection quantity is inhibited, and it is possible to stop engine.

The judge part of the acceleration 64, as the judgment means of cancel of acceleration in the low speed area means, has function to judge whether the acceleration control is ended or not based on the difference between the target number of revolutions of the engine Nset calculated by the calculate part of the target number of revolutions of the engine 61 and the actual number of revolutions of the engine Ne calculated by the calculate part of actual number of revolutions of the engine 62. Only if one of the conditions that the difference between the target number of revolutions of the engine Nset and the actual number of revolutions of the engine Ne is equal to or smaller than the threshold value K3 at which the cancel of the acceleration is determined, that the clutch is thrown out, that the actual number of revolutions of the engine Ne is bigger than the number of revolution K4 at which acceleration is forced to be stopped, or that it is the moment when the engine starts or stops is satisfied, the flag of determination of acceleration is set "OFF".

That the difference between the target number of revolutions of the engine Nset and the actual number of revolutions of the engine Ne is equal to or smaller than the threshold value K3 at which the cancel of the acceleration is determined is included the conditions so as to judge whether acceleration is finished actually or not. That the clutch is thrown out is included the conditions because engine load is light and the fuel injection quantity is small compared to the condition that the clutch is engaged, and it is not necessary to inhibit upper limit of the fuel injection quantity. Particularly, whether the clutch is thrown out or not is judged by judging whether the clutch neutral signal is sent or not based on the information of switch of the clutch 42.

That the actual number of revolutions of the engine Ne is bigger than the number of revolution K4 at which acceleration is forced to be stopped is included in the conditions because the turbo charger is so effective in the condition that it is not necessary to inhibit upper limit of the fuel injection quantity. That it is the moment when the engine starts or stops is included in the conditions so as to cancel the judgment in case of missing the judgment of acceleration in the low speed area because that it is the moment when the engine starts or stops is the condition of the judgment of acceleration in the low speed area.

As shown in FIG. 2, a process of the upper limit of the fuel injection quantity at the acceleration is illustrated. The calculate part of the upper limit of the fuel injection quantity 65, the select part of the minimum number 66, and the process part of the upper limit of the fuel injection quantity 67 has function as the means for inhibiting the upper limit of the fuel injection quantity. The calculate part of the upper limit of the fuel injection quantity 65 is consisted of a calculate part of a first upper limit of a fuel injection quantity 71 which calculates the first upper limit of the fuel injection quantity Qmax1 based on the actual number of revolutions of the engine Ne, and a calculate part of a second upper limit of a fuel injection quantity 72 which calculates the second upper limit of the fuel injection quantity Qmax2 based on intake gas quantity detected by the sensor of intake gas quantity (the sensor of intake gas pressure) 45, and a calculate part of a third upper limit of a fuel injection quantity 73 which calculates the third upper limit of the fuel injection quantity Qmax3 in case that the flag of determination of acceleration is set "ON" in the judge part of the acceleration 64. The select part of the minimum number 66 selects the minimum upper limit of the fuel injection quantity as the minimum upper limit of the fuel injection quantity Qmax in the first upper limit of the fuel injection quantity Qmax1, the second upper limit of the fuel injection quantity Qmax2, and the third upper limit of the fuel injection quantity Qmax3. The process part of the upper limit of the fuel injection quantity 67 judges whether the target fuel injection quantity Qset calculated by the fuel injection quantity 63 is bigger than the minimum upper limit of the fuel injection quantity Qmax selected by the select part of the minimum number 66 or not, and if the target fuel injection quantity Qset is bigger than the minimum upper limit of the fuel injection quantity Qmax, the minimum upper limit of the fuel injection quantity Qmax is the final target fuel injection quantity Qfinal, and if the target fuel injection quantity Qset is not bigger than the minimum upper limit of the fuel injection quantity Qmax, the target fuel injection quantity Qset is the final target fuel injection quantity Qfinal, and the final target fuel injection quantity Qfinal is transmitted to the engine body 10.

The way to calculate the first upper limit of the fuel injection quantity Qmax1, the second upper limit of the fuel injection quantity Qmax2, and the third upper limit of the fuel injection quantity Qmax3 is illustrated. The first upper limit of the fuel injection quantity Qmax1 calculated by the calculate part of the first upper limit of the fuel injection quantity 71 is the fuel injection quantity in which a maximum torque is generated and the first upper limit of the fuel injection quantity Qmax1 is calculated based on the actual number of revolutions of the engine Ne and the map stored in the memory 51.

The second upper limit of the fuel injection quantity Qmax2 calculated by the calculate part of the second upper limit of the fuel injection quantity 72 is the upper limit of the fuel injection quantity based on the intake gas quantity detected by the sensor of intake gas quantity (the sensor of intake gas pressure) 45 and the second upper limit of the fuel injection quantity Qmax2 is calculated based on the intake gas quantity and the map stored in the memory 51. Because the second upper limit of the fuel injection quantity Qmax2 is determined based on the intake gas quantity and the turbo charger is not driven and the intake gas quantity is rarely changed at the early phase of the acceleration, in FIG. 3 (b), the rate of increment is small at the early phase of the acceleration and the rate of increment increases after middle phase when the turbo charger is driven. Therefore, if the second upper limit of the fuel injection quantity Qmax2 is the upper limit value and the fuel is injected, excessive fuel is injected and black smoke is generated. In the present Invention, the third upper limit of the fuel injection quantity Qmax3 is determined which has the smaller upper limit value than the second upper limit of the fuel injection quantity Qmax2 at the early phase of the acceleration so as to generate the black smoke at the early phase of the acceleration. According to the constitution, at the early phase of the acceleration in which the turbo charger is not driven, the upper limit of the fuel injection quantity which is matched for the intake gas quantity is determined by the third upper limit of the fuel injection quantity Qmax3 and prevent the excess fuel injection and prevent the generation of the black smoke.

The third upper limit of the fuel injection quantity Qmax3 calculated by the calculate part of the third upper limit of the fuel injection quantity 73 is the upper limit of the fuel injection quantity which is calculated only if the flag of determination of acceleration is set "ON" in the judge part of the acceleration 64. Particularly, the way to calculate the third upper limit of the fuel injection quantity Qmax3 is illustrated. Firstly, at the moment that the flag of determination of acceleration is set "ON", the bigger one either of the present fuel injection quantity and the idle fuel injection quantity determined based on the actual number of revolutions of the engine Ne at the moment is set as the initial upper limit of the fuel injection quantity Q0 which is the initial upper limit value of the fuel injection quantity. If the present fuel injection quantity is bigger than the idle fuel injection quantity, the present fuel injection quantity is directly set as the initial upper limit of the fuel injection quantity Q0, and if the present fuel injection quantity is smaller than the idle fuel injection quantity, it is judged that the temporary reduction of the fuel injection quantity is occurred and the idle fuel injection quantity is set as the initial upper limit of the fuel injection quantity Q0. Accordingly, because the fuel injection quantity at the moment is set as the initial upper limit of the fuel injection quantity Q0 at the beginning of the acceleration, the drastic increase of the fuel injection quantity is inhibited and the generation of the black smoke is prevented.

While the flag of determination of acceleration is set "ON", in other words, while the determination of acceleration is realized, the third upper limit of the fuel injection quantity Qmax3 is increased by the predefined way from the initial upper limit of the fuel injection quantity Q0. The way to increase the third upper limit of the fuel injection quantity Qmax3 is illustrated. The third upper limit of the fuel injection quantity Qmax3 is calculated with the initial upper limit of the fuel injection quantity Q0.

$$Q\text{max}3 = Q0 + (dQ1 + dQ2^* t)^* t$$

dQ1 is the first coefficient and dQ2 is the second coefficient. For example, if dQ1 is bigger than 0 and dQ2 is equal to 0, in the FIG. 4 (a), the third upper limit of the fuel injection quantity Qmax3 is increased linearly. If dQ1 is bigger than 0 and dQ2 is bigger than 0, in the FIG. 4 (b), the increase rate of the third upper limit of the fuel injection quantity Qmax3 is small at the early phase of recovery and the increase rate of the third upper limit of the fuel injection quantity Qmax3 is big at the later phase of recovery. Accordingly, the responsiveness of the operation of the acceleration is selected as operator likes.

INDUSTRIAL APPLICABILITY

Because the electronically controlled the diesel engine of the present invention makes the drastic increase of the fuel injection quantity from the fuel injection quantity before acceleration inhibit without the measurement of the relation between the number of revolutions of an engine, boost pressure, and the upper smoke limit of the fuel injection quantity, the invention has industrial applicability.

The invention claimed is:

1. An electronically controlled diesel engine configured to determine fuel injection quantity, comprising:
   a means for judging acceleration in a low speed area, the means for judging acceleration in the low speed area is configured to judge whether predefined acceleration is done or not based on a difference between the target number of revolutions of the engine and the actual number of revolutions of the engine;
   a means for judging cancellation of acceleration in the low speed area, the means for judging cancellation of acceleration in the low speed area is configured to judge whether predefined acceleration is finished or not based on a difference between the target number of revolutions of the engine and the actual number of revolutions of the engine;
   a calculator of a fuel injection quantity configured to calculate the fuel injection quantity based on a difference between a target number of revolutions of the engine and an actual number of revolutions of the engine;
   a calculator of an upper limit of the fuel injection quantity, the calculator of an upper limit of the fuel injection quantity comprising:
      a calculator of a first upper limit of the fuel injection quantity based on the fuel quantity generating a maximum torque, a calculator of a second upper limit of the fuel injection quantity based on the intake gas quantity, and a calculator of a third upper limit of the fuel injection quantity;
   a selector of the minimum upper limit of the fuel injection quantity;
   a processor of an upper limit of the fuel injection quantity;

wherein and the third upper limit of the fuel injection quantity is calculated only when an acceleration is detected and the present fuel injection quantity at the moment of detection of the acceleration is set as the third upper limit of the fuel injection quantity if the present fuel injection quantity is bigger than an idle fuel injection quantity corresponding to the actual number of revolutions of the engine at the moment of detection of the acceleration and the idle fuel injection quantity is set as the third upper limit of the fuel injection quantity if the present fuel injection quantity is not bigger than the idle fuel injection quantity, wherein the selector of the minimum upper limit of the fuel injection quantity selects the minimum upper limit of the fuel injection quantity among the first upper limit of the fuel injection quantity, second upper limit of the fuel injection quantity, and the third upper limit of the fuel injection quantity, wherein the processor of an upper limit of the fuel injection quantity is configured to set the minimum upper limit of the fuel injection quantity selected by the selector of the minimum upper limit of the fuel injection quantity as a final target fuel injection quantity if the fuel injection quantity calculated by the calculator of a fuel injection quantity is bigger than the minimum upper limit of the fuel injection quantity selected by the selector of the minimum upper limit of the fuel injection quantity, is configured to set the fuel injection quantity calculated by the calculator of a fuel injection quantity as a final target fuel injection quantity if the fuel injection quantity calculated by the calculator of a fuel injection quantity is not bigger than the minimum upper limit of the fuel injection quantity selected by the selector of the minimum upper limit of the fuel injection quantity, and is configured to transmit the final target fuel injection quantity to the engine.

* * * * *